(12) United States Patent
Park (10) Patent No.: US 10,303,309 B2
(45) Date of Patent: May 28, 2019

(54) DISPLAY DEVICE INCLUDING TOUCH KEY ELECTRODES

(71) Applicant: Samsung Display Co., Ltd., Yongin-si (KR)

(72) Inventor: Jung Mok Park, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 233 days.

(21) Appl. No.: 15/158,072

(22) Filed: May 18, 2016

(65) Prior Publication Data

US 2017/0153725 A1 Jun. 1, 2017

(30) Foreign Application Priority Data

Nov. 26, 2015 (KR) .......................... 10-2015-0166350

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 2203/04111* (2013.01)

(58) Field of Classification Search
CPC .................. G06F 3/044; G06F 3/0412; G06F 2203/04111
See application file for complete search history.

(56) References Cited

U.S. PATENT DOCUMENTS

| | | | |
|---|---|---|---|
| 8,531,430 B2* | 9/2013 | Thelemann | G06F 3/0219 178/18.05 |
| 9,329,741 B2 | 5/2016 | Noguchi et al. | |
| 2010/0083108 A1 | 4/2010 | Rider et al. | |
| 2012/0306754 A1 | 12/2012 | Jeong | |
| 2014/0253501 A1* | 9/2014 | Noguchi | G02F 1/13338 345/174 |
| 2014/0327631 A1* | 11/2014 | Park | G06F 3/041 345/173 |
| 2014/0340348 A1 | 11/2014 | Park | |
| 2015/0349773 A1* | 12/2015 | Gourevitch | H03K 17/9622 200/5 R |

FOREIGN PATENT DOCUMENTS

| | | |
|---|---|---|
| KR | 10-2014-0110761 | 9/2014 |
| KR | 10-2014-0130798 | 11/2014 |
| KR | 10-2014-0135564 | 11/2014 |

* cited by examiner

*Primary Examiner* — Jonathan A Boyd
(74) *Attorney, Agent, or Firm* — H.C. Park & Associates, PLC (57) ABSTRACT

A display device includes a plurality of pixels disposed in a display area, a plurality of first touch electrodes disposed along a first direction in the display area, a plurality of second touch electrodes disposed along a second direction in the display area, a first touch key electrode disposed in a touch key area adjacent to the display area, and a touch controller configured to detect a touch and connected to the plurality of first touch electrodes, the plurality of second touch electrodes, and the first touch key electrode. The plurality of first touch electrodes and the plurality of second touch electrodes are disposed on a same layer.

10 Claims, 8 Drawing Sheets

DISPLAY DEVICE INCLUDING TOUCH KEY ELECTRODES

CROSS-REFERENCE TO RELATED APPLICATION

This application claims priority from and the benefit of Korean Patent Application No. 10-2015-0166350 filed on Nov. 26, 2015, which is hereby incorporated by reference for all purposes as if fully set forth herein.

BACKGROUND

Field

Exemplary embodiments relate to a display device including a touch panel having a portion with a dedicated function.

Discussion of the Background

Display devices such as smart phones include a touch panel disposed on a display panel of a liquid crystal display (LCD) or an organic light emitting diode (OLED) display. In addition to the touch panel inputs, these display devices also have dedicated physical buttons or inputs that complicate the manufacturing process, increase the number of parts required for the display device, and have a high manufacturing cost.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device that includes a touch panel having a portion with a dedicated function.

Exemplary embodiments provide a display device configured to reduce the number of parts of the display device and to simplify the configuration of the display device.

Additional aspects will be set forth in the detailed description which follows, and, in part, will be apparent from the disclosure, or may be learned by practice of the inventive concept.

An exemplary embodiment includes a display device. The display device includes a plurality of pixels disposed in a display area, a plurality of first touch electrodes disposed along a first direction in the display area, a plurality of second touch electrodes disposed along a second direction in the display area, a first touch key electrode disposed in a touch key area adjacent to the display area, and a touch controller configured to detect a touch and connected to the plurality of first touch electrodes, the plurality of second touch electrodes, and the first touch key electrode. The plurality of first touch electrodes and the plurality of second touch electrodes are disposed on a same layer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A display device may include a display panel such as an OLED display panel or an LCD display panel. The display panel may include a plurality of gate lines and a plurality of data lines that are connected to a plurality of pixels. The plurality of pixels may be formed at points where the gate lines and the data lines intersect. When a gate signal of a gate-on voltage is sequentially applied to the plurality of gate lines, a data voltage is applied to the plurality of data lines in response to the gate signal of the gate-on voltage and thus image data is written to the plurality of pixels.

A display device may include a touch panel disposed on or integrated with the display panel. The touch panel may be a capacitive touch panel that detects a touch position by sensing a change in capacitance generated between a conductive object such as an electrode and a finger depending on whether a user touches an object or not.

Conventional display devices with touch panels (e.g., smart phones) still have physical inputs or buttons for dedicated functions (e.g., a menu button or a back button) positioned in the periphery of display device in addition to the touch panel inputs. The physical buttons may be located in the periphery of the display area or non-display area of the display panel. The physical buttons are important to a user because they provide a convenient input that does not change based on what is displayed on the screen. Thus, the user can always go back on screen if the physical button is a back button or return to the main menu if the physical button is a menu button.

However, these physical buttons drive up the cost of conventional display devices because they require complex manufacturing (i.e., additional steps) and extra parts. Specifically, these physical buttons are separately assembled and manufactured from the touch panel and are separately mounted on a flexible printed circuit board (FPCB) of the conventional display device. Thus, the additional parts required for the physical buttons and the separate assembly and mounting process results in complex manufacturing processes and high cost for manufacturing these conventional display devices.

Exemplary embodiments described below reduce the number of parts required for a display device to decrease the manufacturing cost for a display device. In particular, exemplary embodiments provide a display device that includes a touch panel having a portion or a touch key with a dedicated function.

Figure 1:
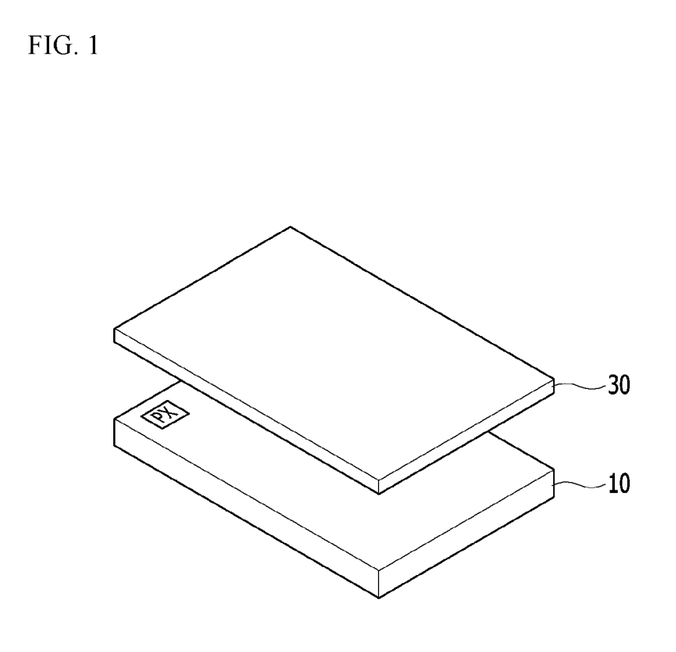
FIG. 1 is a schematic perspective view of a display device according to an exemplary embodiment.

FIG. 1 is a schematic perspective view of a display device according to an exemplary embodiment.

Referring to FIG. 1, the display device includes a display panel 10 and a touch panel 30 disposed on the display panel 10. The touch panel 30 may be formed on or disposed on an outer surface of the display panel 10 as an on-cell type. Alternatively, the touch panel 30 may be formed on or disposed on a separate substrate that may be adhered to the display panel 10. The separate substrate may be any suitable material such as glass or plastic. Although not shown, the touch panel 30 may be formed or disposed inside the display panel 10 as an in-cell type touch panel.

The display panel 10 may include a plurality of pixels PX that are arranged in an approximate matrix form. The plurality of pixels PX may be connected to a plurality of gate lines (not shown) extending in a row direction. The plurality of pixels PX may also be connected to a plurality of data lines (not shown) extending in a column direction. The plurality of gates lines may be substantially parallel to each other. The plurality of data lines may be substantially parallel to each other. The plurality of gate lines may be substantially perpendicular to the plurality of data lines.

When a gate signal of a gate-on voltage is sequentially applied to the plurality of gate lines, a data voltage is applied to the plurality of data lines. Thus, image data may be written to the plurality of pixels PX. The plurality of pixels PX may display an image by emitting light corresponding to the written image data.

The plurality of pixels PX may be pixels PX of any one of an organic light emitting diode (OLED) display, a liquid crystal display (LCD), and a field emission display (FED). That is, the display panel 10 may be any one of display panels 10 of the OLED display, the LCD, and the FED.

The touch panel 30 will now be described with reference to FIGS. 2 and 3.

Figure 2:
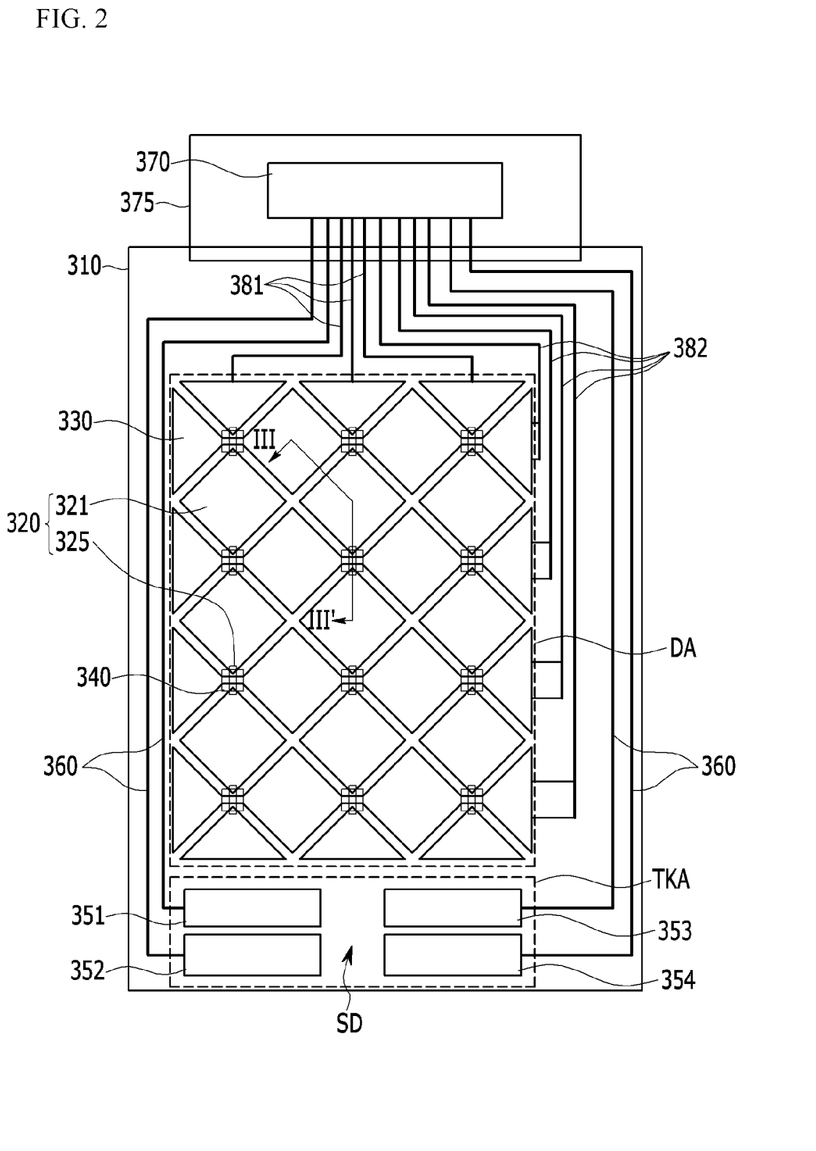
FIG. 2 is a schematic top plan view of a touch panel of the display device according to an exemplary.

FIG. 2 is a schematic top plan view of a touch panel of the display device according to an exemplary embodiment. FIG. 3 is a cross-sectional view of the touch panel of FIG. 2 taken along sectional line III-III' according to an exemplary embodiment.

Figure 3:
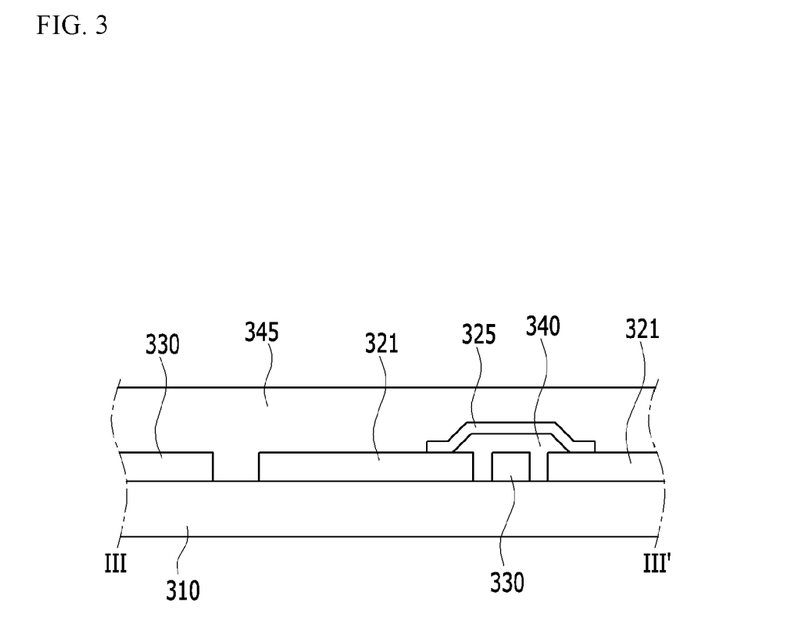
FIG. 3 is a cross-sectional view of the touch panel of FIG. 2 taken along sectional line according to an exemplary embodiment.

Referring to FIGS. 2 and 3, the touch panel 30 may include a plurality of first touch electrodes 320, a plurality of second touch electrodes 330, a plurality of touch key electrodes 351, 352, 353, and 354, a plurality of touch key connecting wires 360, a plurality of first touch connecting wires 381, a plurality of second touch connecting wires 382, and a touch controller 370.

The plurality of first touch electrodes 320, the plurality of second touch electrodes 330, the plurality of touch key electrodes 351, 352, 353, and 354, the plurality of touch key connecting wires 360, the plurality of first touch connecting wires 381, and the plurality of second touch connecting wires 382 may be disposed on a substrate 310. The substrate 310 may be formed of a transparent insulator. For example, the substrate may include any suitable transparent insulator such as glass or plastic. The substrate 310 may be a separate substrate for the touch panel 30. Alternatively, the substrate 310 may be an upper substrate of the display panel 10.

The substrate 310 may be divided into a display area DA and a touch key area TKA. The display area DA may correspond to an area of the display panel 10 where the plurality of pixels is disposed to display an image. The touch key area TKA may be adjacent to the display area and may correspond to an area where a touch key is disposed. The touch key refers to a touch type of key button for entering a predetermined user command. For example, in a smartphone, the touch key may have a dedicated function such as a return button for displaying a previous screen, a menu button for displaying a menu screen, or a home button for displaying a home screen. Any dedicated function or suitable function may be used. In an exemplary embodiment, a touch key's dedicated function may be changed. For example, a touch key may have a default function of returning to a previous screen (e.g., a back button) but may be changed to a have a function of changing the display to a menu screen (e.g., a menu button).

In the display area DA, the plurality of first touch electrodes 320 may be disposed in a first direction and the plurality of second touch electrodes 330 may be disposed in a second direction. The first direction may be perpendicular to the second direction, but it is not limited to being perpendicular to the second direction. Here, although by no means limiting, exemplary embodiments are described and illustrated such that the first direction is analogous to a column and the second direction is analogous to a row.

The plurality of first touch electrodes 320 and the plurality of second touch electrodes 330 may be disposed on the same layer over the substrate 310. The plurality of first touch electrodes 320 and the plurality of second touch electrodes 330 may be formed or disposed as a specific pattern on the same layer. The plurality of first touch electrodes 320 and the plurality of second touch electrodes 330 may be formed or disposed as the specific pattern in regions other than the region where they intersect each other. For example, the pattern of the plurality of second touch electrodes 330 may be a plurality of rhombus-shaped expansions that are connected in the first direction.

The plurality of first touch electrodes 320 may include a plurality of rhombus-shaped electrode portion 321, and electrode connecting members 325 for interconnecting the plurality of electrode portion 321 in the first direction. The plurality of rhombus-shaped electrode portions 321 of the first touch electrodes 320 may be disposed between the plurality of second touch electrodes 330. An insulating layer 340 may be disposed at points where the plurality of first touch electrodes 320 and the plurality of second touch electrodes 330 intersect each other. The electrode connecting members 325 may be disposed on the insulating layer 340 in the form of a bridge to interconnect the plurality of rhombus-shaped electrode portions 321 in the first direction. The insulating layer 340 may prevent the plurality of first touch electrodes 320 from short circuiting the plurality of second touch electrodes 330 or vice versa.

In practice, the plurality of second touch electrodes 330 and the electrode portions 321 of the plurality of first touch electrodes 320 may be disposed on the same layer over the substrate 310. The electrode connecting members 325 may be disposed on a different layer than the plurality of first touch electrodes 320 and the plurality of electrode portions 321 while interposing the insulating layer 340 between a portion of the plurality of electrode portions 321 and the electrode connecting members 325. The plurality of first touch electrodes 320 and the plurality of electrode portions 321 that are disposed on the same layer may be formed of the same material in a manufacturing process.

Here, the insulating layer 340 is illustrated and described to be disposed at the points where the first touch electrodes 320 and the second touch electrodes 330 intersect. However, the insulating layer 340 may be formed on an entire surface of the substrate 310 where the plurality of first touch electrodes 320 and the plurality of electrode portions 321 are disposed. In this case, a contact hole (not shown) for connecting the plurality of electrode portions 321 in the first direction may be formed in the insulating layer 340, and the electrode connecting members 325 may interconnect the plurality of electrode portions 321 in the first direction via the contact hole.

The plurality of first touch electrodes 320, the plurality of second touch electrodes 330, the plurality of electrode portions 321 of the plurality of first touch electrodes 320, and the electrode connecting members 325 may include or be formed of any suitable material. For example, the plurality of first touch electrodes 320, the plurality of second touch electrodes 330, the plurality of electrode portions 321 of the plurality of first touch electrodes 320, and the electrode connecting members 325 may each include at least one of a transparent conductive oxide (TCO) (e.g., indium tin oxide (ITO) or indium zinc oxide (IZO)), a conductive nanowire (e.g., a silver nanowire (AgNW), and a metal mesh.

A passivation layer 345 may be disposed on the plurality of first touch electrodes 320 and the plurality of second touch electrodes 330. The passivation layer 345 may protect the plurality of first touch electrodes 320 and the plurality of second touch electrodes 330 from the external environment. The passivation layer 345 may include an inorganic insulating material such as a silicon oxide ($SiO_X$, X≥1) or a silicon nitride ($SiN_Y$, Y≥1). Alternatively, the passivation layer 345 may include an organic insulating material such as a cellulose derivative, an olefin-based resin, an acryl-based resin, a vinyl chloride-based resin, a polyester-based resin, a polyamide-based resin, a polycarbonate-based resin, a polycycloolefin resin, or an epoxy resin.

The plurality of touch key electrodes 351, 352, 353, and 354 may be disposed in the touch key area TKA. A first touch key electrode 351 and a second touch key electrode 352 may be paired at one side of the touch key area TKA. The first touch key electrode 351 may be disposed adjacent to and parallel (or substantially parallel) to the second touch key electrode 352. The paired first and second touch key electrodes 351 and 352 may form a first touch key. A third touch key electrode 353 and a fourth touch key electrode 354 may be paired at a different location of the touch key area TKA. For example, the third and fourth touch key electrodes 353 and 354 may be disposed at an opposite end of the touch kea area TKA from the end that the first and second touch key electrodes 351 and 352. The third touch key electrode 353 may be disposed adjacent to and parallel (or substantially parallel) to the fourth touch key electrode 354. The paired third and fourth touch key electrodes 353 and 354 may form a second touch key.

The first touch key electrode 351 may be disposed to be spaced apart from the third touch key electrode 353 by a separation distance SD. The second touch key electrode 352 may be disposed to be spaced apart from the fourth touch key electrode 354 by the separation distance SD. The first, second, third, and fourth touch key electrodes 351, 352, 353, and 354 may be disposed on the same layer over the substrate 310. The first, second, third and fourth touch key electrodes 351, 352, 353, and 354 may each include at least one of a transparent conductive oxide (TCO) (e.g., an indium tin oxide (ITO) or an indium zinc oxide (IZO)), a conductive nanowire (e.g., an silver nanowire (AgNW), and a metal mesh.

The first, second, third and fourth touch key electrodes 351, 352, 353, and 354 may be disposed on the same layer as the plurality of second touch electrodes 330 and the electrode portions 321 of the plurality of first touch electrodes 320. The first, second, third and fourth touch key electrodes 351, 352, 353, and 354, the plurality of second touch electrodes 330, and the electrode portions 321 of the plurality of first touch electrodes 320 may be simultaneously formed of the same material in the manufacturing process.

The touch controller 370 may be mounted on a film 375. The film 375 may be connected to one side of the substrate 310. The film 375 may be a flexible printed circuit board (FPCB). The film 375 may be connected to a side of the substrate 310 opposite from the touch key area TKA. The display area DA may be disposed between the film 375 and the touch key area TKA. However, the position of the film 375 is not limited to the area opposite the touch kea area TKA.

The plurality of first touch connecting wires 381 may be disposed outside of the display area DA. The plurality of first touch connecting wires 381 may correspondingly connect the plurality of first touch electrodes 320 to the touch controller 370.

The plurality of second touch connecting wires 382 may be disposed outside of the display area DA. The plurality of second touch connecting wires 382 may correspondingly connect the plurality of second touch electrodes 330 to the touch controller 370.

The plurality of touch key connecting wires 360 may be disposed outside of the display area DA. The plurality of touch key connecting wires 360 may correspondingly connect the first, second, third, and fourth touch key electrodes 351, 352, 353, and 354 to the touch controller 370.

The plurality of first touch connecting wires 381, the plurality of second touch connecting wires 382, and the plurality of touch key connecting wires 360 may include a metal material having excellent conductivity. For example, the plurality of first touch connecting wires 381, the plurality of second touch connecting wires 382, and the plurality of touch key connecting wires 360 may each include at least one of copper (Cu), aluminum (Al), molybdenum (Mo), and silver (Ag).

The touch controller 370 may apply a touch driving signal to any one of the plurality of first touch electrodes 320 and the plurality of second touch electrodes 330 via the plurality of first touch connecting wires 381 or the plurality of second touch connecting wires 382. In addition, the touch controller 370 may detect a touch position by receiving a touch detection signal for representing a change in capacitance of the one of the plurality of first touch electrodes 320 and the plurality of second touch electrodes 330 that does not receive the touch driving signal from the touch controller 370 via the plurality of first touch connecting wires 381 or the plurality of second touch connecting wires 382.

For example, the touch controller 370 may detect the touch position by sequentially applying the touch driving signal to the plurality of first touch electrodes 320 via the plurality of first touch connecting wires 381 and then receiving the touch detection signal for representing a change in capacitance of the plurality of second touch electrodes 330 via the plurality of second touch connecting wires 382. Alternatively, the touch controller 370 may detect the touch position by sequentially applying the touch driving signal to the plurality of second touch electrodes 330 via the plurality of second touch connecting wires 382 and then receiving the touch detection signal for representing a change in capacitance of the plurality of first touch electrodes 320 via the plurality of first touch connecting wires 381.

In addition, the touch controller 370 may apply a touch key driving signal to any one of the first touch key electrode 351 and the second touch key electrode 352. In addition, the touch controller 370 may detect whether the first touch key is touched by receiving the touch key detection signal for representing a change in capacitance from one of the first touch key electrode 351 and the second touch key electrode 352 that does not receive the touch key driving signal.

The touch controller 370 may apply the touch key driving signal to any one of the third touch key electrode 353 and the fourth touch key electrode 354. In addition, the touch controller 370 may detect whether the second touch key is touched by receiving the touch key detection signal for representing a change in capacitance from one of the third touch key electrode 353 and the fourth touch key electrode 354 that does not receive the touch key driving signal.

As described above, since the touch key is included in the touch panel 30, the touch controller 370 may not only detect the touch position of the display area DA but may also detect whether the touch key is touched. Thus, each touch key may replace a physical button eliminating the need to prepare and mount touch keys as separate FPCB. Therefore, the number of parts of the display device may be reduced and the configuration of the display device is simplified.

A display device, according to exemplary embodiments, will be described with reference to FIGS. 4, 5, 6, 7, and 8. Differences between the exemplary embodiments described with respect to FIG. 2 will be mainly described for brevity.

Figure 4:
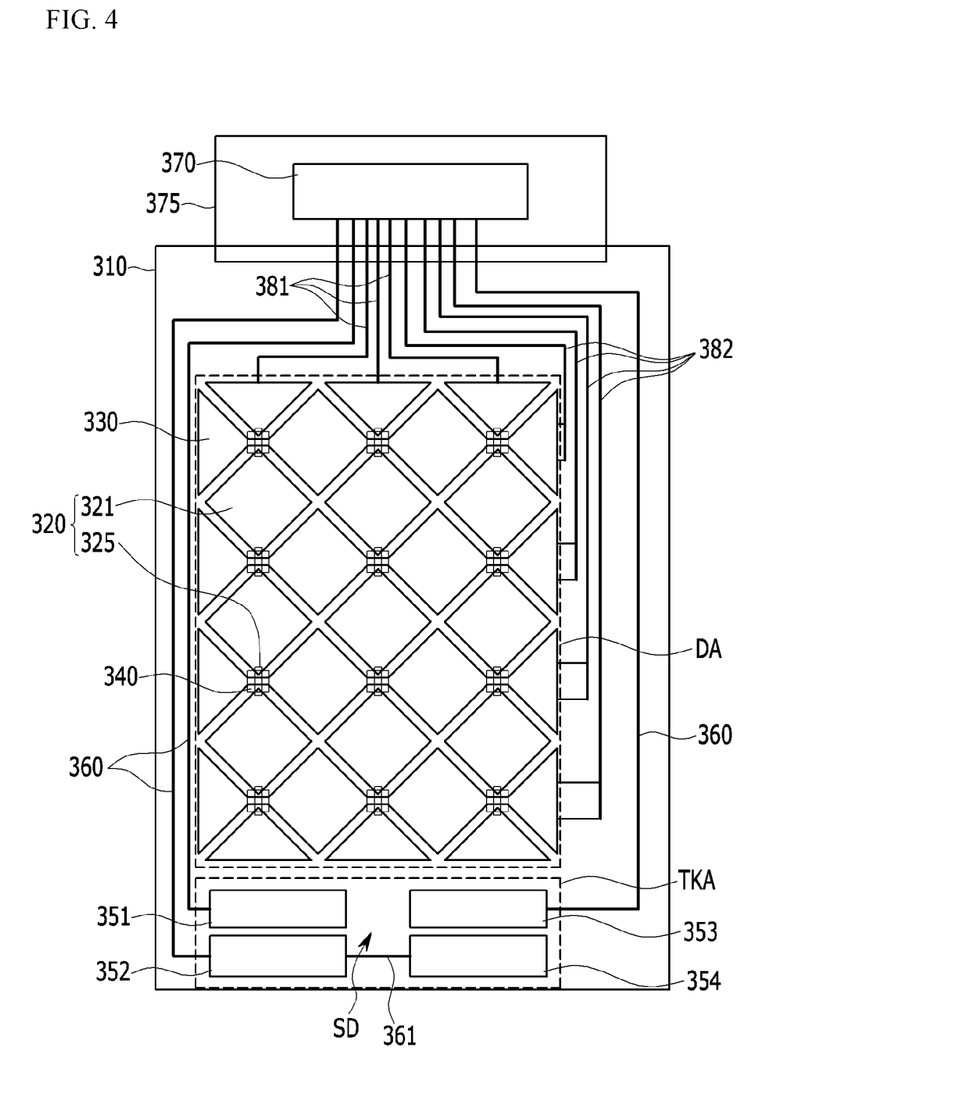
FIG. 4 is a schematic top plan view of a touch panel of the display device according to an exemplary embodiment.

FIG. 4 is a schematic top plan view of a touch panel of the display apparatus according to an exemplary embodiment.

Referring to FIG. 4, first, second, third, and fourth touch key electrodes 351, 352, 353, and 354 may be disposed in a touch key area TKA. A first touch key electrode 351 may be paired with a second touch key electrode 352. The first and second touch key electrodes 351 and 352 may be disposed at one side of the touch key area TKA and may form a first touch key. A third touch key electrode 353 may be pair with a fourth touch key electrode 354. The third and fourth touch key electrodes 353 and 354 may be disposed at an opposite side of the touch key area TKA from the first and second touch key electrodes 351 and 352 and may form a second touch key. The first, second, and third touch key electrodes 351, 352, and 353 may be connected to a plurality of touch key connecting wires 360. The touch key connecting wires 360 may be disposed outside of the display area DA and may correspondingly connect the first, second, and third touch key electrodes 351, 352, and 353 to the touch controller 370. The fourth touch key electrode 354 may be directly connected to the second touch key electrode 352 via an auxiliary connecting wire 361. The fourth touch key electrode 354 may be disposed to be spaced apart by a separation distance SD.

The touch controller 370 may apply a touch key driving signal to the second touch key electrode 352 via the touch key connecting wires 360. The touch key driving signal applied to the second touch key electrode 352 may be transmitted to the fourth touch key electrode 354 via the auxiliary connecting wire 361. The touch controller 370 may detect whether the first touch key is touched by receiving the touch key detection signal from the first touch key electrode 351, and may detect whether the second touch key is touched by receiving the touch key detection signal from the third touch key electrode 353.

As described above, by directly connecting the fourth touch key electrode 354 to the second touch key electrode 352 via the auxiliary connecting wire 361, the number of touch key connecting wires 360 disposed outside of the display area DA can be reduced and a bezel width of the display device can be reduced.

Figure 5:
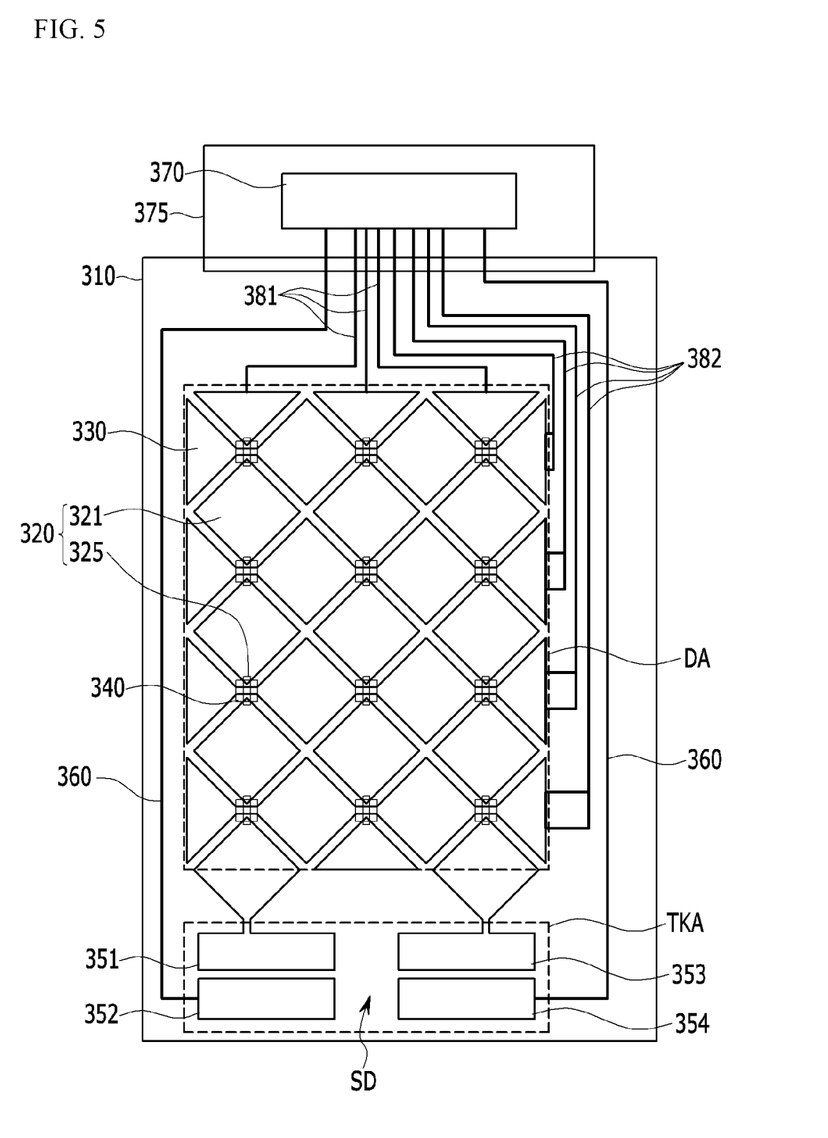
FIG. 5 is a schematic top plan view of a touch panel of the display device according to an exemplary embodiment.

FIG. 5 is a schematic top plan view of a touch panel of the display device according to an exemplary embodiment.

Referring to FIG. 5, first, second, third, and fourth touch key electrodes 351, 352, 353, and 354 may be disposed in a touch key area TKA. A first touch key electrode 351 may be paired with a second touch key electrode 352. The first and second touch key electrodes 351 and 352 may be disposed at one side of the touch key area TKA and may form a first touch key. A third touch key electrode 353 may be paired with a fourth touch key electrode 354. The third and fourth touch key electrodes 353 and 354 may be disposed at an opposite end of the touch key area TKA to form a second touch key.

The first touch key electrode 351 may be directly connected to any one of the plurality of first touch electrodes 320, and the third touch key electrode 353 may be directly connected to another one of the plurality of first touch electrodes 320. The first touch key electrode 351 may be patterned and formed together the plurality of electrode portions 321 of the plurality of first touch electrodes 320 such that the first touch key electrode 351 may be connected to any one of the electrode portions 321. Similarly, the third touch key electrode 353 may be patterned and formed together the plurality of electrode portions 321, such that third touch key electrode 353 may be connected to the other one of the electrode portions 321. Accordingly, the first touch key electrode 351 and the third touch key electrode 353 may be disposed on the same layer as the plurality of electrode portions 321 of the plurality of first touch electrodes 320.

The second touch key electrode 352 and the fourth touch key electrode 354 are connected to a plurality of touch key connecting wires 360 that are disposed outside of a display area DA. The plurality of touch key connecting wires 360 may be disposed outside of the display area DA and correspondingly connect the second touch key electrode 352 and the fourth touch key electrode 354 to the touch controller 370.

The touch controller 370 may apply a touch driving signal to the second touch key electrode 352 via the touch key connecting wires 360. The touch controller 370 may detect whether the first touch key is touched by receiving a touch key detection signal from the first touch key electrode 351. In this case, the touch key detection signal of the first touch key is transmitted to the touch controller 370 via the plurality of first touch electrodes 320 to which the first touch key electrode 351 is connected.

Alternatively, the touch controller 370 may apply a touch key driving signal, via the first touch connecting wires 381, to the plurality of first touch electrodes 320 to which the first touch key electrode 351 is connected. The touch key driving signal may be transmitted to the first touch key electrode 351 via the plurality of first touch electrodes 320, and the touch controller 370 may detect whether the first touch key is touched by receiving the touch key detection signal from the second touch key electrode 352.

The touch controller 370 may apply the touch driving signal to the fourth touch key electrode 354 via the touch key connecting wires 360. The touch controller 370 may detect whether the second touch key is touched by receiving the touch key detection signal from the third touch key electrode 353. In this case, the touch key detection signal of the second touch key may be transmitted to the touch controller 370 via the plurality of first touch electrodes 320 to which the third touch key electrode 353 is connected.

Alternatively, the touch controller 370 may apply the touch key driving signal, via the first touch connecting wires 381, to the plurality of first touch electrodes 320 to which the third touch key electrode 353 is connected. The touch key driving signal may be transmitted to the third touch key electrode 353 via the plurality of first touch electrodes 320, and the touch controller 370 may detect whether the second touch key is touched by receiving the touch key detection signal from the fourth touch key electrode 354.

As described above, by directly connecting the first touch key electrode 351 and the third touch key electrode 353 to the plurality of first touch electrodes 320, the number of touch key connecting wires 360 disposed outside of the display area DA can be reduced and a bezel width of the display device can be reduced.

Figure 6:
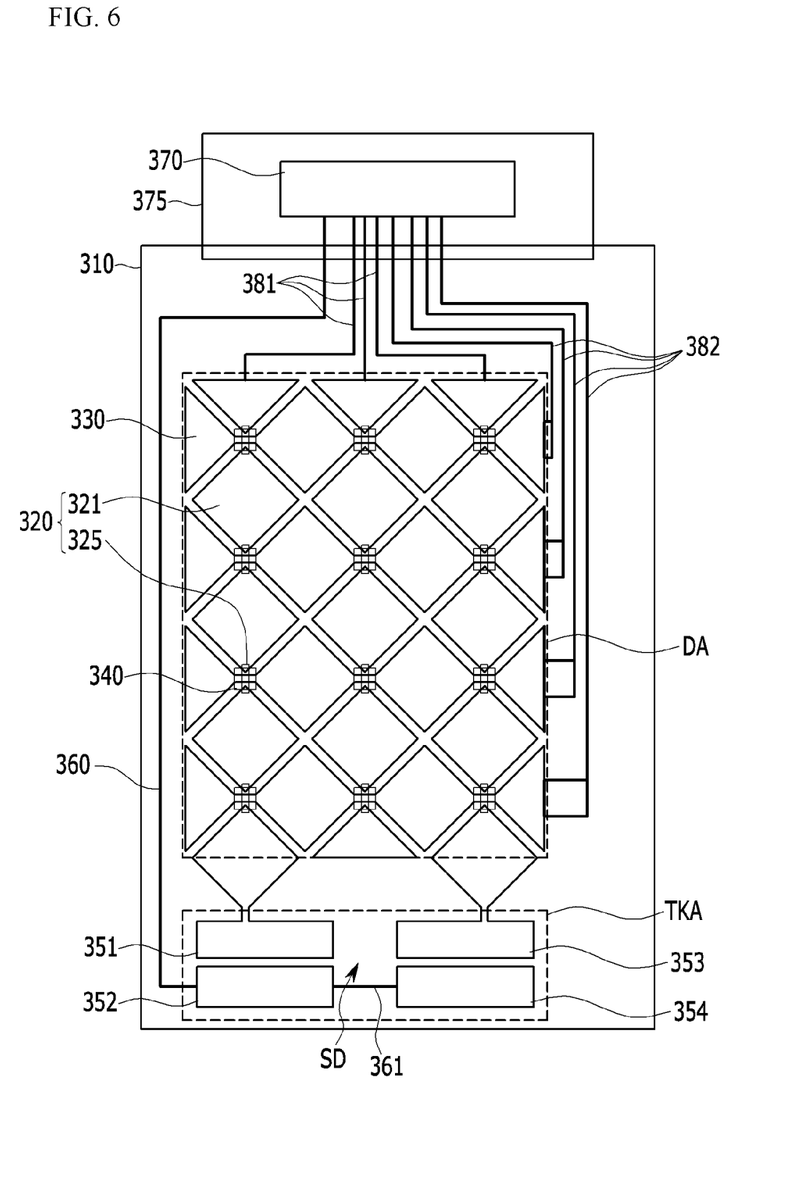
FIG. 6 is a schematic top plan view of a touch panel of the display device according to an exemplary embodiment.

FIG. 6 is a schematic top plan view of a touch panel of the display device according to an exemplary embodiment.

Compared with FIG. 5, a fourth touch key electrode 354 may not be connected to touch key connecting wires 360 as shown in FIG. 6. Instead, the fourth touch key electrode 354 may be directly connected to a second touch key electrode 352 via an auxiliary connecting wire 361.

The touch controller 370 may apply a touch key driving signal to the second touch key electrode 352 via the touch key connecting wires 360. The touch key driving signal applied to the second touch key electrode 352 may be transmitted to the fourth touch key electrode 354 via the auxiliary connecting wire 361. The touch controller 370 may detect whether a first touch key is touched by receiving a touch key detection signal from a first touch key electrode 351. In this case, the touch key detection signal of the first touch key is transmitted to the touch controller 370 via the plurality of first touch electrodes 320 to which the first touch key electrode 351 is connected. In addition, the touch controller 370 may detect whether a second touch key is touched by receiving the touch key detection signal from a third touch key electrode 353. In this case, the touch key detection signal of the second touch key is transmitted to the touch controller 370 via the plurality of first touch electrodes 320 to which the third touch key electrode 353 is connected.

By directly connecting the fourth touch key electrode 354 to the second touch key electrode 352 via the auxiliary connecting wire 361, the number of touch key connecting wires 360 disposed outside of the display area DA can be further reduced, and a bezel width of the display device can be reduced.

Figure 7:
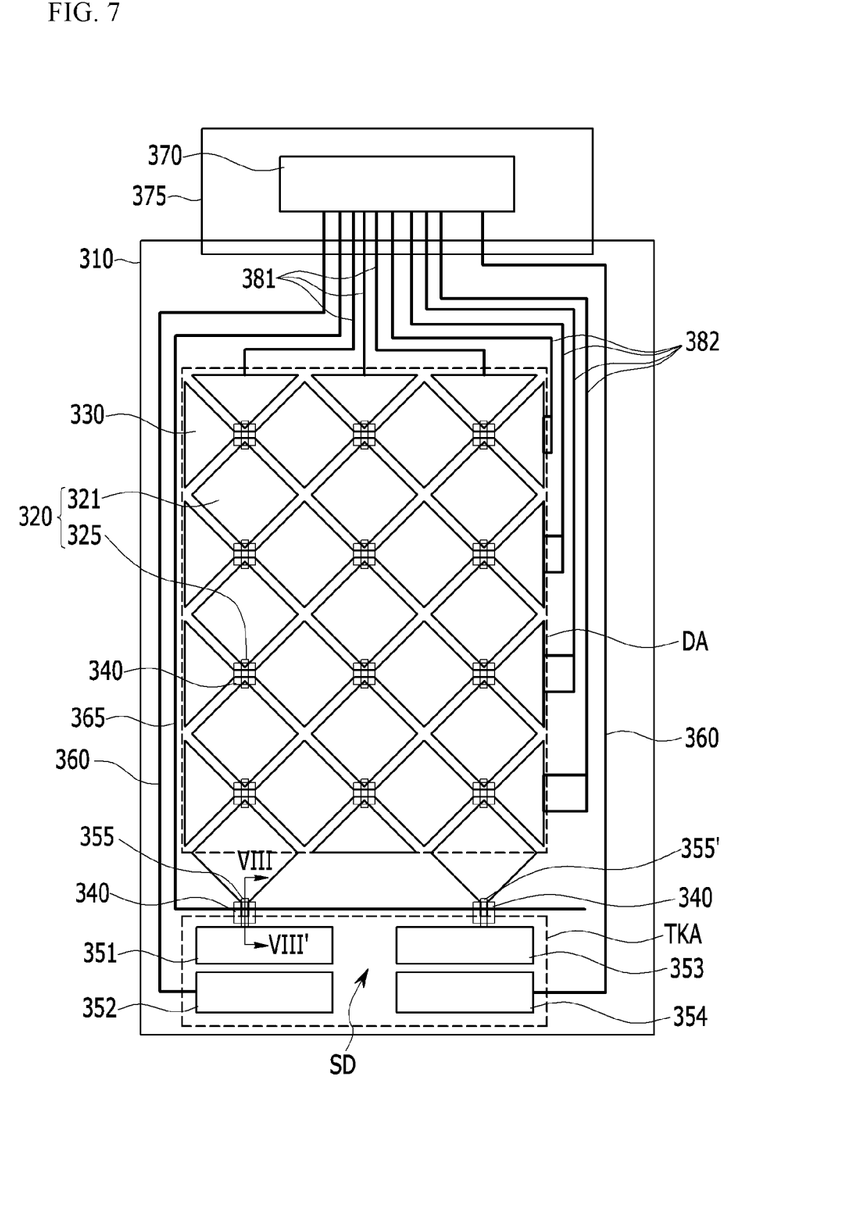
FIG. 7 is a schematic top plan view of a touch panel of the display device according to an exemplary embodiment.
Figure 8:
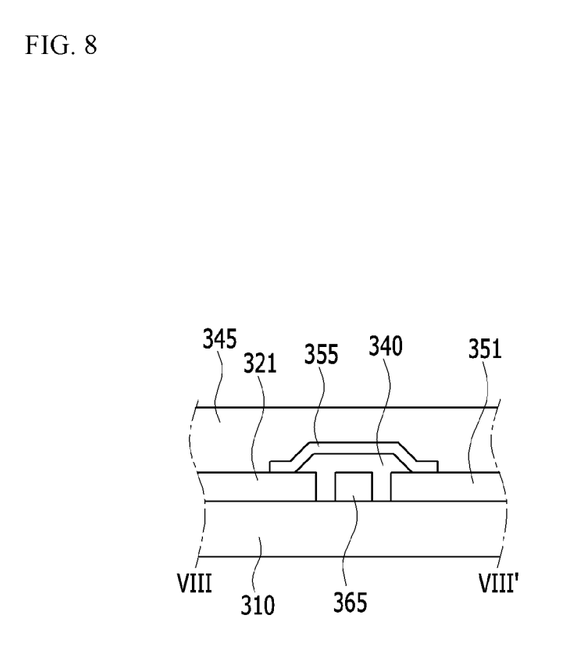
FIG. 8 is a cross-sectional view of the touch panel of FIG. 7 taken along sectional line VIII-VIII' according to an exemplary embodiment.

FIG. 7 is a schematic top plan view of a touch panel of the display device. FIG. 8 is a cross-sectional view of the touch panel of FIG. 7 taken along sectional line VIII-VIII' according to an exemplary embodiment.

Referring to FIGS. 7 and 8, a touch panel 30 may further include a protection wire 365 disposed along an edge of a display area DA. The protection wire 365 may be connected to a touch controller 370. A ground voltage or a specific level of voltage may be applied to the protection wire 365. The protection wire 365 may, when a touch position is detected using a plurality of first touch electrodes 320 and a plurality of second touch electrodes 330, serve to eliminate noise or to protect a touch panel from external static electricity or other similar events.

The protection wire 365 may be disposed between the display area DA and a touch key area TKA.

In this case, as shown in FIG. 8, an electrode portion 321 of any one of the plurality of first touch electrodes 320 and the first touch key electrode 351 may be disposed on a substrate 310. The protection wire 365 may be disposed on the substrate 310 between the electrode portion 321 and the first touch key electrode 351. As such, the electrode portions 321 of the plurality of first touch electrodes 320, the first touch key electrode 351, and the protection wire 365 may be disposed on the same layer over the substrate 310.

Since the protection wire 365 may extend between the display area DA and the touch key area TKA, the protection wire 365 may be disposed on the substrate 310 between the electrode portions 321 of another one of the plurality of first touch electrodes 320 and the third touch key electrode 353. Put another way, the electrode portions 321 of the plurality of first touch electrodes 320, the first, second, third and fourth touch key electrodes 351, 352, 353, and 354, and the protection wire 365 may be disposed on the same layer over the substrate 310.

An insulating layer 340 may be disposed between the electrode portion 321 of any one of the plurality of first touch electrodes 320 and the first touch key electrode 351. That is, the insulating layer 340 may be disposed to enclose the lateral side of the protection wire 365 as well as enclose top portion of the protection wire 365. A first touch key connecting member 355 may be disposed in the form of a bridge on the insulating layer 340, and may interconnect the plurality of first touch electrodes 320 and the first touch key electrode 351.

The insulating layer 340 may also be disposed between the electrode portions 321 of another one of the plurality of first touch electrodes 320 and the third touch key electrode 353. A second touch key connecting member 355' may be disposed in the form of a bridge on the insulating layer 340 to interconnect the plurality of first touch electrodes 320 and the third touch key electrode 353. The insulating layer 340 may insulate the protection wire 365 from the plurality of first touch electrodes 320, the first touch key electrode 351, and the third touch key electrode 353 such that the protection wire 365 is not short-circuited by the plurality of first touch electrodes 320, the first touch key electrode 351, and the third touch key electrode 353.

The first, second, third and fourth touch key electrodes 351, 352, 353, and 354 may be formed in the touch key area TKA using the same process as described with respect to the plurality of the first touch electrodes 320 and the plurality of second touch electrodes 330. The insulating layer 340 may be formed at points where the plurality of first touch electrodes 320 and the plurality of second touch electrodes 330 intersect. The electrode connecting member 325 may be formed on the insulating layer 340.

The second touch key electrode 352 and the fourth touch key electrode 354 may be connected to a plurality of touch key connecting wires 360 that are disposed outside of the display area DA. The plurality of touch key connecting wires 360 may be disposed outside of the display area DA and may correspondingly connect the second touch key electrode 352 and the fourth touch key electrode 354 to the touch controller 370.

The touch controller 370 may detect whether a first touch key and a second touch key are touched as described with reference to FIG. 5.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:
a substrate comprising a display area and a touch key area;
a plurality of pixels disposed in the display area;
a plurality of first touch electrodes disposed along a first direction in the display area;
a plurality of second touch electrodes disposed along a second direction in the display area;
a first touch key electrode disposed the touch key area adjacent to the display area;
a second touch key electrode disposed in the touch key area and paired with the first touch key electrode to form a first touch key with the first touch key electrode;
a touch controller configured to detect a touch and connected to the plurality of first touch electrodes, the plurality of second touch electrodes, and the first touch key electrode;
a touch key connecting wire disposed outside of the display area and configured to connect the second touch key electrode to the touch controller without connecting to the plurality of first touch electrodes and the plurality of second touch electrodes;
an insulating layer disposed on the substrate between a first one of the plurality of first touch electrodes and the first touch key electrode; and
a first touch key connecting member disposed on the insulating layer and configured to connect the first one of the plurality of first touch electrodes to the first touch key electrode,
wherein the plurality of first touch electrodes and the plurality of second touch electrodes are disposed on a same layer.

2. The display device of claim 1, wherein the first touch key electrode, the second touch key electrode, and the plurality of first touch electrodes are disposed on the same layer.

3. The display device of claim 2, further comprising a third touch key electrode spaced apart from the first touch key electrode in the touch key area, the third touch key electrode and the first touch key electrode being disposed on the same layer.

4. The display device of claim 3, further comprising a fourth touch key electrode disposed in the touch key area and paired with the third touch key electrode to form a second touch key with the third touch key electrode.

5. The display device of claim 4, wherein the fourth touch key electrode and the third touch key electrode are disposed on the same layer.

6. The display device of claim 1, further comprising:
a third touch key electrode spaced apart from the first touch key electrode by a separation distance in the touch key area and the third touch key electrode and the first touch key electrode disposed on the same layer; and
a fourth touch key electrode disposed in the touch key area and paired with the third touch key electrode to form a second touch key with the third touch key electrode.

7. The display device of claim 6, further comprising a second touch key connecting member disposed on the insulating layer and configured to connect a second one of the plurality of first touch electrodes to the third touch key electrode.

8. The display device of claim 7, further comprising a protection wire disposed outside of the display area, between the first one of the plurality of first touch electrodes and the first touch key electrode and between the second one of the plurality of first touch electrodes and the third touch key electrode.

9. The display device of claim 8, further comprising a touch key connecting wire disposed outside of the display area and configured to connect the fourth touch key electrode to the touch controller.

10. The display device of claim 8, wherein the protection wire and the first, second, third, and fourth touch key electrodes are disposed on the same layer.

* * * * *